United States Patent [19]
Every et al.

[11] Patent Number: 5,470,137
[45] Date of Patent: Nov. 28, 1995

[54] COPY VALVE FOR AN ANTI-LOCK BRAKE SYSTEM

[75] Inventors: Peter Every, Livonia; Gerald Sivulka, Ann Arbor; Edward M. Fuller, Manchester, all of Mich.

[73] Assignee: Kelsey-Hayes, Romulus, Mich.

[21] Appl. No.: 291,289

[22] Filed: Aug. 16, 1994

[51] Int. Cl.$^6$ ........................................ B60T 8/32
[52] U.S. Cl. ........................ 303/188; 303/116.2
[58] Field of Search ............... 303/113.1, 113.5, 303/116.1, 116.2, 117.1, 111, DIG. 1, DIG. 2

[56] References Cited

U.S. PATENT DOCUMENTS

| | | | |
|---|---|---|---|
| 3,980,346 | 9/1976 | Leiber | 303/6.01 |
| 4,033,637 | 7/1977 | Leiber | 303/115.1 |
| 4,600,244 | 7/1986 | Leiber | 303/111 |
| 4,720,151 | 1/1988 | Belart et al. | 303/111 |
| 4,744,610 | 5/1988 | Arikawa | 303/111 |
| 4,886,321 | 12/1989 | DeLaBroise et al. | 303/92 |
| 4,893,881 | 1/1990 | Farr | 303/113.5 |
| 4,971,401 | 11/1990 | Arikawa | 303/111 |
| 5,131,729 | 7/1992 | Wetzel | 303/113.5 |

*Primary Examiner*—Matthew C. Graham
*Attorney, Agent, or Firm*—Brooks & Kushman

[57] ABSTRACT

A copy valve for an anti-lock brake system. The copy valve has a housing enclosing four chambers. A first and fourth chamber of the enclosed four chambers receives pressurized fluid directly from the first and second cylinders of a dual master brake cylinder. The third chamber receives the pressure of the controlled brake actuator while the second chamber is connectable to the uncontrolled brake actuator. In one embodiment, a single piston is enclosed in the housing and the first and second chambers are disposed at the opposite ends of the piston. The piston has an enlarged collar intermediate the two ends which is received in an annular recess provided in the housing. The third chamber is formed between a first face of the piston's enlarged collar and the annular recesses while the fourth chamber is formed between the opposite face of the piston's enlarged collar and the adjacent face of the housing. A throughbore is provided through the piston connecting the first and second chambers. A valve disposed in the throughbore is open when the piston is in the second chamber and closed when the piston is displaced from the second chamber.

10 Claims, 3 Drawing Sheets

COPY VALVE FOR AN ANTI-LOCK BRAKE SYSTEM

TECHNICAL FIELD

The invention is related to the field of fluid valves and, in particular, to a copy valve for an anti-lock brake system.

BACKGROUND ART

Current anti-lock brake systems only control the pressure of the brake fluid applied to a brake actuator for one of the rear wheels and use a copy valve which controls the pressure of the brake fluid applied to the brake actuator of the other rear wheel. The copy valve reproduces the pressure of brake fluid applied to the brake actuator of the second rear wheel so that it will be substantially the same as the pressure of the brake fluid being applied to the brake actuator being controlled by the anti-lock brake system.

Leiber, in U.S. Pat. No. 4,600,244, and De La Broise et al., in U.S. Pat. No. 4,886,321, disclose diagonally-split anti-lock brake systems using a single copy valve to control the brake pressure being applied to the brake actuator of one of the rear wheels. Wetzel, in U.S. Pat. No. 5,131,729, discloses a diagonally-split anti-lock brake system which uses two copy valves to control the brake pressure applied to each rear wheel to be the same as applied to its diagonally associated front wheel. Leiber, in U.S. Pat. No. 4,033,637, teaches a vertical anti-lock brake system using a single copy valve causing the pressure applied to the brake actuators of the rear wheels to be a copy of the pressure applied to the brake actuators of the front wheels. While Farr, in U.S. Pat. No. 4,893,881, discloses a diagonally-split anti-lock brake system using two copy valves to copy the pressure of the brake fluid applied to the controlled rear wheel brake actuator to the uncontrolled brake actuator of the other rear wheel.

The prior art teaches various types of copy valves for anti-lock brake systems. The copy valve disclosed herein is an improved copy valve for anti-lock brake systems.

SUMMARY OF THE INVENTION

A copy valve for an anti-lock brake system having a housing enclosing four internal chambers. A first port is provided to transmit a first pressurized fluid received from a first external source to a first of the four internal chambers. A second port is provided to transmit a fluid in a second of the four chambers external to the housing. A third port is provided to transmit a pressurized fluid to a third of the four internal chambers from a second external source and a fourth port is provided to transmit a pressurized fluid from a third external source to a forth chamber. The copy valve further includes means provided in the housing responsive to the pressure of said first, second and third pressurized fluids being substantially equal for providing an unobstructed fluid path between the first and second chambers. The means further being responsive to the pressure of the third pressurized fluid in the third chamber being less than the pressure of the first and fourth pressurized fluids for blocking the fluid path between the first and second chambers and reducing the pressure in the second chamber to be substantially equal to the pressure in the third chamber, and further responsive to the pressure of the fourth pressurized fluid being less than the pressure of the first pressurized fluid to provide an unobstructed fluid path between the first and second chambers.

The advantage of the copy valve is that it faithfully copies the pressure in the third chamber in the second chamber.

Another advantage is that the copy valve permits the braking of one or the other of the rear brake actuators in the event of a failure of the master brake cylinders, its associated brake actuator or associated brake line.

These and other advantages will become more apparent from a reading of the specification in conjunction with the drawings.

DETAILED DESCRIPTION OF THE INVENTION

Figure 1:
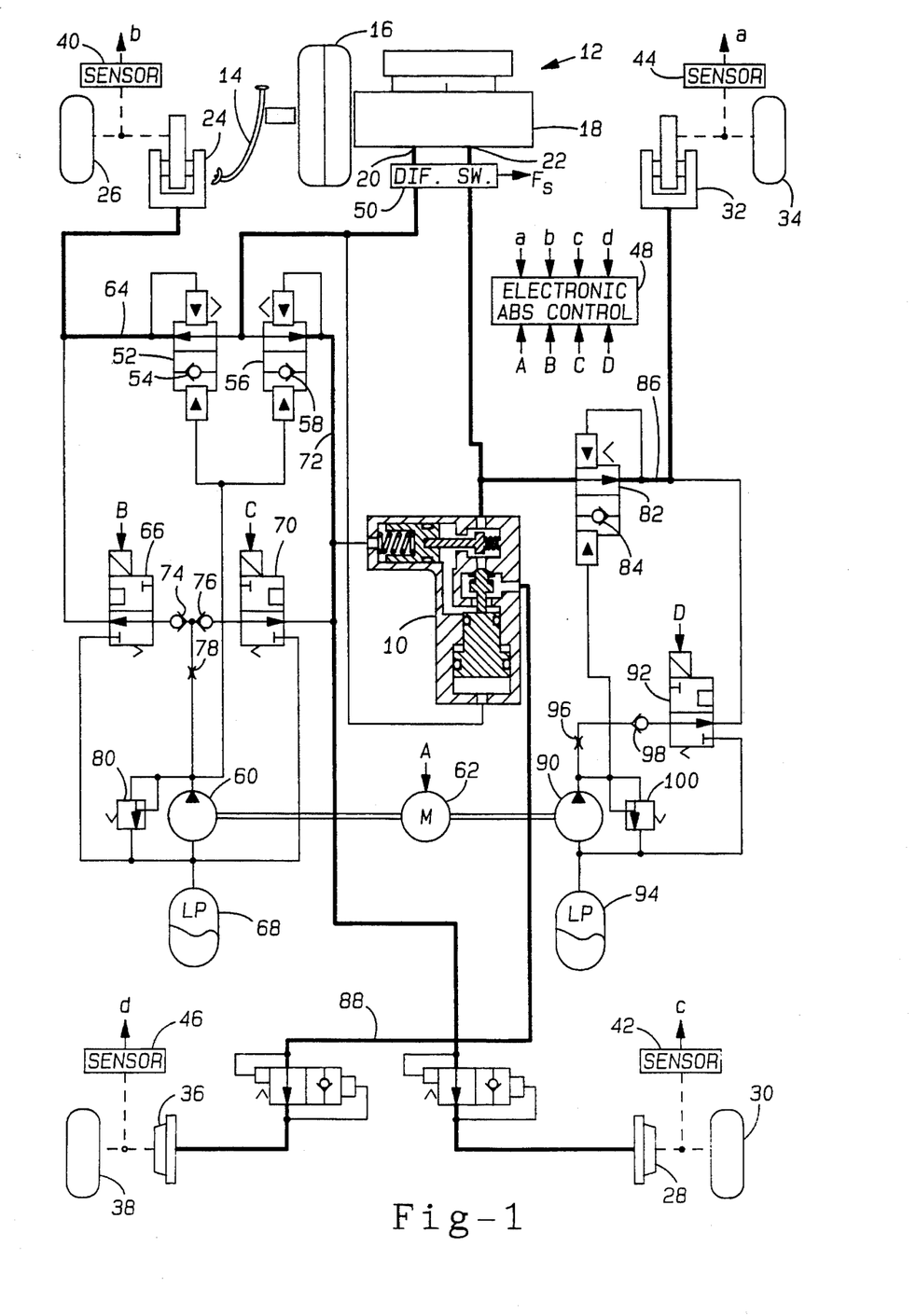
FIG. 1 is a hydraulic circuit diagram of an anti-lock brake system incorporating the copy valve.

FIG. 1 shows an anti-lock brake system for an automotive vehicle incorporating the copy valve 10 of this invention. The details of the copy valve 10 are shown in various operational states in FIGS. 2–4. Referring to FIG. 1, an operator-actuated brake mechanism 12 which includes a brake pedal or actuator 14, a booster 16 and a tandem or dual cylinder master brake cylinder 18 having two independent outlet ports 20 and 22. The brake mechanism 12 is of a conventional design, well known in the art.

The anti-lock brake system is a diagonal-split brake system in which the brake actuator 24 for the left front wheel 26 and the brake actuator 28 for the right rear wheel 30 are connected to the first outlet port 20 of the master brake cylinder 18 and the brake actuator 32 for the right front wheel 34 and the brake actuator 36 for the left rear wheel 38 are connected to the second output port 22 of the master brake cylinder 18. Wheel speed sensors 40, 42, 44 and 46 monitor the rotational speed of the wheels 26, 30, 34 and 36, respectively, and generate signals to an electronic anti-lock brake control 48. The electronic anti-lock brake control 48 may be of any type known in the art which generates an output signal to the motor 60 and solenoid valves 66, 70, 92 to prevent any selected one or all of the wheels 26, 30, 34 and 38 from locking up in response to the actuation of the brake pedal 14.

A differential switch 50 monitors the pressure difference between the first outlet port 20 and the second outlet port 22 of the master brake cylinder 18 and generates a fault signal $F_s$ when brake fluid pressure between the first and second outlet ports differ by a preselected value. As is known in the art, the fault signal $F_s$ is used to activate a fault indicator in the vehicle signifying that one of the first and second master cylinders or their associated brake circuits has failed.

The first outlet 20 port of the master brake cylinder 18 is connected to the inputs of a pair of fluid actuated or pilot valves 52 and 56. The pilot valves 52 and 56 have a first state connecting the outlet port 20 directly to the brake actuator 24 of the left front wheel 26 and connecting the outlet port 20 to the brake actuator 28 of the right rear wheel 30. The pilot valves 52 and 56 have a second state interposing check valves 54 and 58, respectively, between the outlet ports 20 and the brake actuators. The pilot valves 52 and 56 are placed in the second state in response to the brake fluid pressure being applied to brake actuators 24 or 28, being less than the fluid pressure at the output of a pump 60. The pump 60 is actuated by an electric motor 62 in response to an output signal A being generated by the electronic ABS control 48.

A brake fluid line 64 connected between the brake actuator 24 and the pilot valve 52 is also connected to a first output to a two state solenoid valve 66 activated in response to the output signal B generated by the electronic ABS control 48. A second output of the solenoid 66 is connected to the input side of the pump 60 and to a fluid reservoir 68. The unactivated state of the solenoid valve 66 connects the output of the pump 60 to the brake fluid line 64 and the input side of the pump 60 is blocked. In the activated state of the solenoid valve 66, its first and second outputs are connected to each other, connecting the brake actuator 24 to the reservoir 68 and the input side of the pump 60. Therefore, when solenoid valve 66 is activated by the output signal B generated by the electronic ABS control 46, the pump 60 will draw brake fluid from brake actuator 24, terminating the braking of wheel 26. As a result of the reduced brake fluid pressure in brake fluid line 64, when solenoid valve 66 is in the second state and pump 60 is activiated, the pilot valve 52 will be actuated to its second state and the check valve 54 will inhibit the flow of brake fluid from the first outlet port 20 of the master brake cylinder 18 to fluid line 64.

A fluid line 72 connected between the pilot valve 56 and the brake actuator 28 is also connected to a first input of a two state second solenoid valve 70 which is identical in construction to the first solenoid valve 66. The second output of the second solenoid valve 70 is also connected to the fluid reservoir 68 and to the input of the pump 60. As described relative to the first solenoid valve 66, when the second solenoid valve 70 is activated in response to a signal C being generated by the electronic ABS control 48, the brake fluid line 72 is connected to the fluid reservoir 68 and to the input of the pump 60 which reduces the brake fluid pressure on brake fluid line 72. The output of pump 60 and the reduced pressure on brake fluid line 72 causes the pilot valve 56 to switch to its second state in which the check valve 58 inhibits a fluid flow from the first outlet port 20 of the dual master cylinder 18 to brake fluid line 72. The reduced brake pressure in brake fluid line 72 in response to the actuation of the second solenoid valve 70 releases the braking force on wheel 30 produced by brake actuator 28.

The output of the pump 60 is connected to the inputs of solenoid valves 66 and 70 through check valves 74 and 76, respectively. The check valves 74 and 76 prevent a reverse fluid flow through the pump 60 when the fluid brake pressure at the first outlet port 20 of the dual master cylinder 18 is higher than the pressure produced by the pump 60 and when the solenoid valves 66 and 70 are in their unactivated state. A restriction 78 is disposed between the output of the pump 60 and the check valves 74 and 76 to limit the output of the pump 60 in the event of a failure in the brake lines 64 and 72 or the brake actuators 24 or 28. A relief or bypass valve 80 is connected between the output and input of the pump 60 to limit the maximum pressure of the fluid being pumped by pump 60.

The second outlet port 22 of the master brake cylinder 18 is connected to the brake actuator 32 of the right front wheel 34 through a two-position pilot valve 82 and a brake fluid line 86 and to the brake actuator 36 of the left rear wheel 38 through the copy valve 10 and brake fluid line 88. The pilot valve 82 is substantially the same as pilot valves 52 and 56 and has a first state connecting the outlet port 22 directly to brake fluid line 86 in response to the fluid pressure on brake fluid line 86 being higher than the fluid pressure generated by a pump 90 which also is mechanically connected to the electric motor 62 and a second state which inserts a check valve 84 between the second outlet port 22 and brake actuator 32 in response to a third solenoid valve 92 being actuated, reducing the pressure on brake line 86 to be less than the pressure generated by the pump 90. In the first state of the pilot valve 82, the second outlet port 22 is directly connected to the brake actuator 32 through brake fluid line 86, while in its second state, a check valve 84 inhibits a brake fluid flow from the second outlet port 22 to the fluid line 86 and to the brake actuator 32.

Brake fluid line 86 and brake actuator 32 are also connected to one outlet of the third two-position solenoid valve 92 activated in response to the electronic ABS control 48 generating a signal D. The second outlet of the solenoid valve 92 is connected to a fluid reservoir 94 and to the input side of the pump 90. In the unactivated state of the solenoid valve 92, the brake fluid line 86 is connected directly to the output of pump 90 through a restriction 96 and a check valve 98. In the activated stateof solenoid valve 92, the brake fluid line 86 is connected to the input of pump 90 and reservoir 94, reducing the braking force produced by the brake actuator 32 on wheel 34. A relief or bypass valve 100 is connected between the input and output of the pump 90. The restrictor 96, check valve 98 and relief valve 100 perform the same functions as restrictor 78, check valves 74 and 76, and relief valve 80.

The copy valve 10 is connected directly to the first outlet port 20, to the second outlet port 22 of the dual master cylinder 18, to the brake actuator 28 of the right rear wheel 30 through brake fluid line 72 and to brake actuator 36 for the left rear wheel 38 through brake fluid line 88.

During normal operation, the pressure of the brake fluid output at the first and second outlet ports 20 and 22 is a function of the pressure applied to the brake pedal 14. In the event that the braking force produced by one or more of the brake actuators 24, 28, 32 or 36 approaches a force sufficient to lock up the associated wheel, this condition is sensed by the associated sensors 40, 42, 44 and 46 and the electronic ABS control 48 will generate output signals A plus B, C, or D, or possibly all four. The output A will energize motor 60, the output B will actuate solenoid valve 66, output C will actuate solenoid valve 70, while output D will actuate solenoid valve 92. The activation of solenoid valves 66 or 92 will release the brake fluid pressure on brake actuators 24 or 32, respectively, reducing the braking force on wheels 26 or 34. Actuation of solenoid valve 70 will release the brake fluid pressure on brake actuator 28 reducing the braking force on wheel 30. Copy valve 10 is responsive to the reduced brake fluid pressure on brake line 72 and will simultaneously reduce the brake fluid pressure on brake line 88, reducing the braking force applied to the left rear wheel 38. If the electronic ABS control simultaneously generates the signals B or D, the solenoid valves 66 or 90 will be activated and reduce the brake fluid pressure applied to brake actuator 24 or to brake actuator 32, reducing the braking force applied to wheel 26 or 34, respectively, preventing it from locking up. Otherwise, the brake fluid pressure generated at the second output port 22 will be applied directly to the brake actuator 32.

Figure 2:
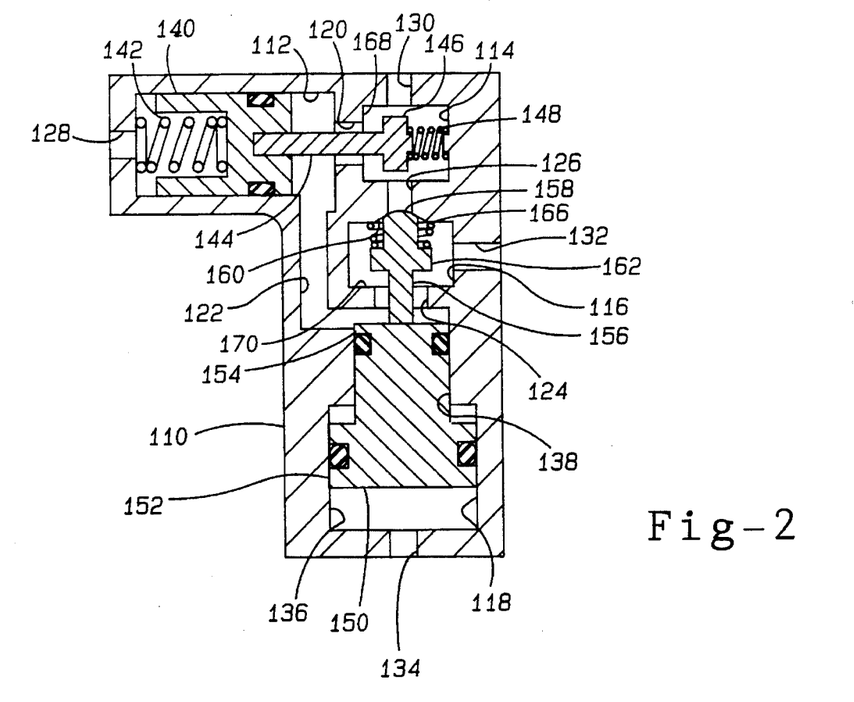
FIG. 2 is a cross-sectional side view of a first embodiment of the copy valve in a first state.

The details of the copy valve 10 will now be described with reference to FIGS. 2, 3 and 4. Referring first to FIG. 2, the copy valve 10 has an elbow-shaped housing 110 having a first chamber 114, a second chamber 116, a third chamber 112 and a fourth chamber 118. A valve aperture 120 connects the first chamber 114 to the third chamber 112. A first fluid passage 122 connects the third chamber 112 to the fourth chamber 118, a second fluid passage 124 connects the second chamber 116 to the fourth chamber 118, and a fourth fluid passage 126 connects the first chamber 114 to the second chamber 116. The second chamber 112 has a port 128 connectable to the brake line of the control side rear brake, such as brake line 72 and brake actuator 28, shown in FIG. 1. The first chamber 114 has a port 130 connectable to a support side output of the dual cylinder master cylinder such as second outlet port 22, shown in FIG. 1. The second chamber 116 has an output port 132 connectable to the support side rear brake actuator such as brake actuator 36, as shown in FIG. 1. The fourth chamber 118 has an input port 134 connectable to the control side output of the dual cylinder master cylinder, such as the first outlet port 20 of the master brake cylinder 18. The fourth chamber 118 is a stepped cylinder having a large diameter portion 136 adjacent to input port 134 and a small diameter portion 138 adjacent to fluid passage 124.

A piston 140 is disposed in the third chamber 112 and is resiliently biased by a spring 142 toward the first chamber 114. The piston 140 has a lost motion valve stem 144 attached thereto, which extends through the valve aperture 120 in to the first chamber 114 under normal operating conditions. The lost motion valve stem 144 has a head portion 146 disposed in the first valve chamber 114. The head portion 146 is biased by a spring 148 to close the valve aperture 120 when the piston 140 is displaced to the left, as shown in FIG. 2, against the force of spring 142.

A piston 150 is disposed in the fourth chamber 118. The piston 150 has a large diameter portion 152 received in the large diameter portion 136 of the fourth chamber 118 and a small diameter portion 154 received in the small diameter portion 138 of the fourth chamber 118. A valve stem 156 is attached to the top surface of the small diameter portion 154 of the piston 150. The valve stem 156 extends through the passageway 124 into the second chamber 116. The valve stem 156 has a rounded end portion 158 which is engageable with a conical valve seat 160 provided at the end of passageway 126 adjacent to the second chamber 116. The valve stem 144 also has an annular collar 162 which is adapted to engage a flat valve seat 170 provided in the second chamber 116 circumscribing passageway 124. A spring 166 disposed in the second chamber 116 engages the annular collar 162 and resiliently biases the valve stem 156 and the piston 160 toward the port 134.

In operation, prior to the initiation of the anti-lock braking routine by the electronic ABS control 48, the forces applied to the opposite sides of the piston 140 from the second outlet port 22 and the first outlet port 20 via brake line 72 are substantially equal. Therefore, piston 140 is displaced to the right, as shown in FIG. 2 by spring 142. In this position, the head 146 of the headed valve stem 144 is displaced from the valve aperture 120 providing a fluid path from the first chamber 114 to the passageway 122. Since the brake fluid pressure received from the first output 20 is received into the fourth chamber 118, the fluid pressure received at the input port 134 acts on the large diameter portion 152, while the brake fluid pressure received from the second output 22 acts on the small diameter portion 154 of the piston 150, the piston 150 will be displaced toward the second chamber 116 against the force of spring 166 until the rounded end portion 158 of the valve stem 156 engages the conical valve seat 160, blocking the fluid path between the first and the second chambers 114 and 116, respectively, through passageway 126. The brake fluid path through the copy valve 10 is from the second outlet port 22 of the master brake cylinder 18, through inlet port 130 through the first chamber 114, through passageway 122 through the fourth chamber 118, through passageway 124, the second chamber 116 and through outlet port 132 connected by brake line 88 to the brake actuator 36 of the left rear wheel.

Figure 3:
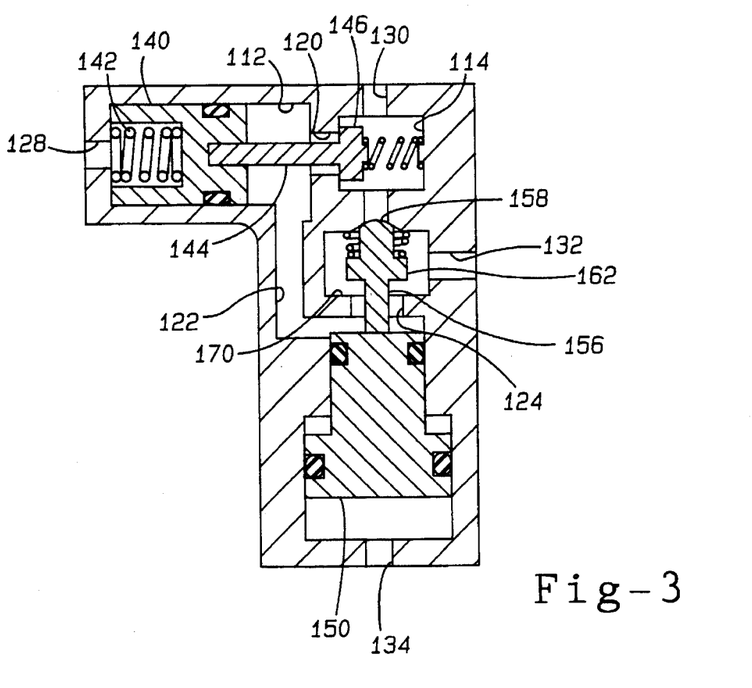
FIG. 3 is a cross-sectional side view of the copy valve shown in FIG. 2 in a second state.
Figure 4:
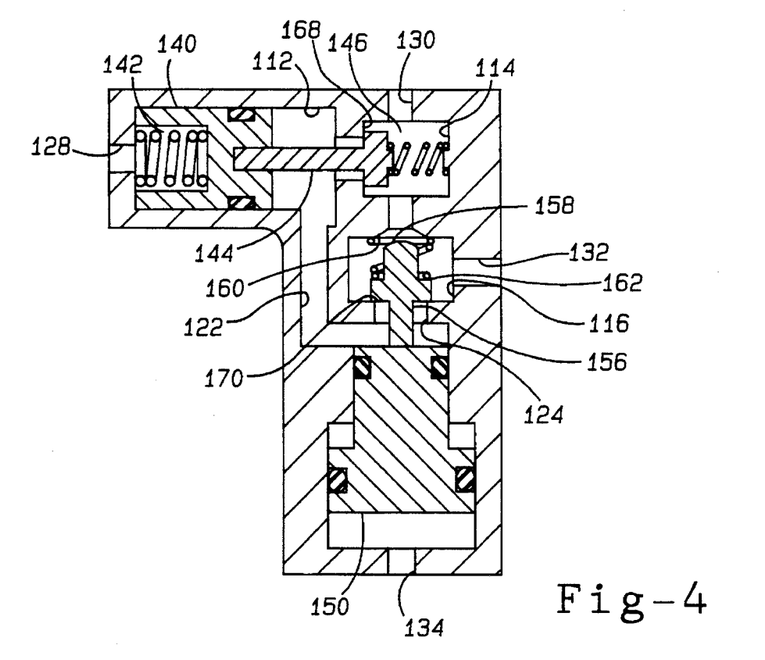
FIG. 4 is a cross-sectional side view of the copy valve shown in FIG. 2 in a third state.

Referring to FIG. 3, when solenoid valve 70 is activated by the electronic ABS control, the brake pressure on brake line 72 is decreased. The decreased brake pressure on brake line 72 is applied to the back side of piston 140 which faces the port 128. The brake pressure from the second outlet port 22 being applied to the front side of the piston 140 will displace the piston 140 toward the inlet port 128. The spring 148 will now seat the head 146 of the lost motion valve stem 144 against a valve seat 168 formed about the valve aperture 120. This will isolate the third chamber 112 from the first chamber 114 and terminate the brake fluid passage from the second outlet port 22 to brake actuator 36. The brake fluid pressure applied to brake actuator 36 prior to the actuation of the electronic ABS control 48 will now be applied to the side of piston 140 opposite inlet port 128 and the piston 140 will be displaced to the left, as shown in FIG. 3. This displacement of the piston 140 reduces the brake fluid pressure applied to the brake actuator 36 at substantially the same time as the brake fluid pressure is reduced on brake line 72 and brake actuator 28.

When the solenoid valve 70 is deactivated, the brake fluid pressure at the first outlet port 20 is returned to brake line 72 and brake actuator 28. The brake fluid pressure at the first outlet 20 is again applied to the back side of piston 140 and with the aid of spring 142 displaces the piston 140 to the position shown in FIG. 2. Prior to the disengagement of the head 146 from the valve seat 168, the displacement of piston 140 produces a fluid flow through outlet port 132, which is applied to brake actuator 36, indicating once more the braking of wheel 38. It is recognized that when the piston 140 is displaced a predetermined distance, the lost motion valve stem will displace the head portion 146 from the valve seat 168, restoring the copy valve 10 to the state shown in FIG. 2. The resilient force produced by the spring 142 is selected such that by the action of piston 140, the brake fluid pressures applied to brake actuators 28 and 36 are substantially equal to each other. Therefore, the wheels 30 and 38 are braked and released simultaneously and with substantially the same force.

The failure of the master cylinder 18 to produce a high fluid pressure at the outlet port 20 or a failure of the associated fluid circuit which results in a low pressure at the outlet port 20 in response to the depression of brake pedal 14 will be described with reference to FIG. 4. When the brake fluid pressure at the outlet port 20 is low, piston 140 will be displaced to the left against the force of spring 142 by the brake fluid pressure received at the inlet port 130 from the outlet port 22 of the master brake cylinder 18, and piston 150 will be displaced toward inlet port 134. The displacement of piston 140 will cause the head 146 of valve stem 144 to engage valve seat 168 and the displacement of piston 150 will unseat the rounded end 158 of the valve stem 156 from the conical valve seat 160 and will seat the annular collar 162 against the valve seat 120 surrounding the second fluid passageway 124 in the second chamber 116, as shown in FIG. 4. In this state, the brake actuator 36 is connected directly to the outlet port 22 of the master brake cylinder 18. Therefore, diagonally disposed wheels 34 and 38 will be simultaneously braked upon the depression of the brake pedal 14 by brake actuators 32 and 36, respectively. In this state, activation of solenoid valve 70 by the electronic ABS control will not affect the brake fluid pressure applied to brake actuator 36.

In the event of the failure of the master brake cylinder 18 to produce an output at the second outlet port 22 in response to the depression of brake pedal 14, or a failure of the associated brake lines or brake actuators 32 and/or 36, the copy valve 10 will assume the same state as in FIG. 2 and only brake actuators 24 and 28 will be actuated by the actuation of brake pedal 14. In this state, the actuation of solenoid valve 70 by the electronic ABS controller 48 will only reduce the fluid pressure on brake actuator 28 in the anti-lock mode of operation.

Figure 5:
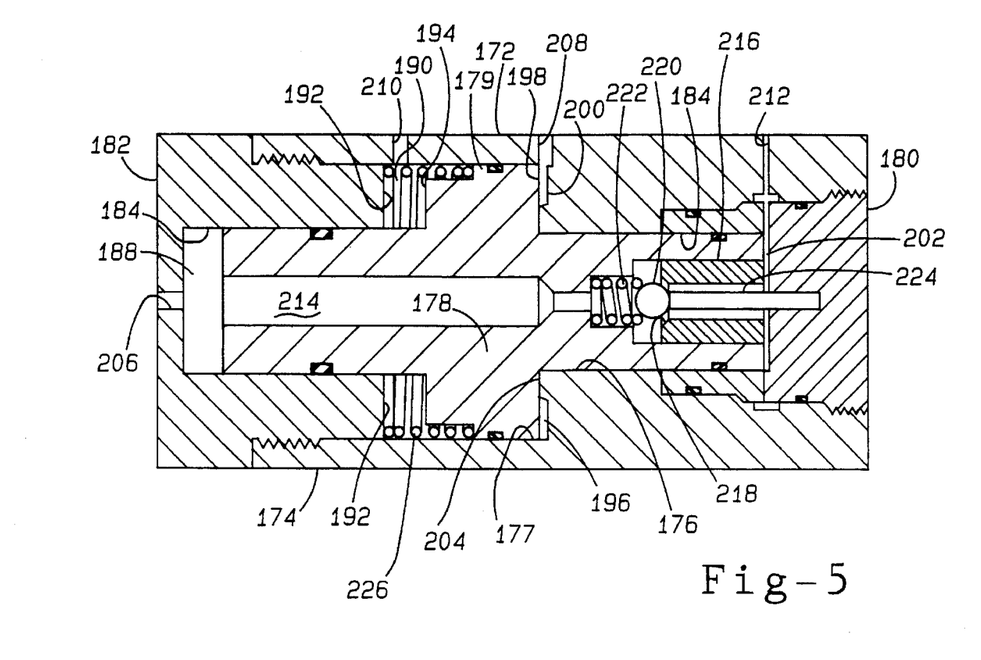
FIG. 5 is a cross-sectional side view of an alternate embodiment of the copy valve.

A second embodiment of the copy valve 10 is shown on FIG. 5. In this embodiment, the housing 172 has a central portion 174 having a multiple stepped bore 176 which receives a piston 178. The piston 178 has an annular collar 179 which is received in an annular recess 177 formed by the stepped bore 176. The housing 172 further includes a first end cap 180 enclosing one end of the central portion 174 and a second cap 182 enclosing the opposite end of the central portion 174. The internal end 192 of the second end cap 182 defines one end of the annular recess 177.

The first cap 180 has a cylindrical bore 184 receiving a first portion of the piston 178 while the second cap 182 has a cylindrical bore 186 slidably receiving the other end of the piston 178. The caps 180 and 182 may be threadably attached to the central portion 174 as shown or may be attached using any other method known in the art. A first chamber 188 is formed between the end of the piston 178 and the second cap 182, a third chamber 190, is formed between the internal end 192 of the second cap 182 and one face of the annular collar 194. A fourth chamber 196 is formed between the opposite face 198 of the annular collar 179 and an annular shoulder 200 of the central portion 174 of the housing 172, and a second chamber 202 formed between the opposite end of the piston 178 and the internal face of the cap 180. The central portion 174 of the housing 172 also has an annular stop boss 204 which is engaged by the face 198 of the annular collar to maintain a predetermined separation of the face 198 of the annular collar 177 from the annular shoulder 200 of the housing 172. The engagement of the annular face 198 with the annular boss 204 also maintains a separation of the end of the piston 178 from the internal face of the cap 180 to form the second chamber 202.

An input port 206 permits the connection of the first chamber 188 to one of the outlet ports of the master brake cylinder, such as the second outlet port 22, shown in FIG. 1. In a like manner, an input port 208 permits the connection of the fourth chamber 196 to the other outlet port of the master brake cylinder 18, such as the first outlet port 20. A port 210 connects the third chamber 190 to the controlled brake actuator, such as brake actuator 28, whose actuation is controlled by the solenoid valve 70. A port 212 connects the second chamber 202 to the support brake actuator, such as brake actuator 36 shown in FIG. 1.

The piston 178 has a throughbore 214 which connects the first chamber 188 to the second chamber 202. A cylindrical insert 216 is fixedly attached to the end of piston 178 adjacent to the second chamber 202. The cylindrical insert 216 has a conical ball seat 218 on the end opposite the second chamber 202. A check ball 220 disposed in bore 216 is biased by a spring 222 toward the ball seat 218. A stem 224 attached to the cap 180 maintains the check ball 220 displaced from the ball seat 218 when face 198 the piston 178 is displaced against the annular shoulder 204. A spring 226 disposed in the third chamber 190 resiliently biases the annular face 198 of piston 178 against the annular shoulder 204.

In operation, when the brake pedal 14 is depressed, producing a pressurized fluid output at the outlet ports 20 and 22, the fluid pressure applied to the stepped shoulder 194 from the brake actuator 28 and the fluid pressure applied to the annular face 198 of the piston 178 from the outlet port 20 of the master cylinder are substantially equal, therefore the spring 226 biases the annular face of the piston 178 against the annular boss 204. In this state, the stem 224 displaces the ball 220 from the ball seat 218 and provides an uninhibited fluid path from the inlet port 206 through throughbore 214 to the support side brake actuator (brake actuator 36).

When the electronic ABS control 48 actuates solenoid valve 70, the fluid brake pressure applied to brake actuator 28 and to the third chamber is decreased which results in the annular face 198 of the piston 178 being displaced away from the annular boss 204. During the initial displacement of the piston 178, the ball 220 will seat on ball seat 218, closing the fluid passage between the first chamber 188 to the second chamber 202. Continued displacement of the piston 178 will draw brake fluid from the brake actuator 36, reducing the braking force being applied to wheel 38.

When solenoid valve 70 is deactivated, the brake fluid pressure applied to brake actuator 28 and to the third chamber 190 increases and displaces the piston 178 to engage its annular face 198 with the annular boss 204. This displacement of the piston 178 causes the ball 220 to be unseated from the ball seat 218, restoring the fluid flow path between the second outlet 22 of the master cylinder 18 and the brake actuator 36 through the throughbore 214 of the copy valve.

When there is a failure of the master brake cylinder 18 to produce an output at outlet port 20 or a failure of the associated brake line or actuator, the piston 178 will be displaced engaging the annular face 198 with the annular boss 204 by spring 226 maintaining an unobstructed fluid path between the second outlet port 22 and the brake actuator 36. When there is a failure of the master brake cylinder 18 to produce an output at the outlet port 22 or a failure of the associated brake line or brake actuator, the piston 178 will also be displaced to engage the annular boss 204 by spring 226, maintaining an unobstructed fluid path between the second outlet port 22 and brake actuator 36. Therefore, the operation of the embodiment shown in FIG. 5 is substantially the same as the embodiment shown in FIG. 2.

While the best mode for carrying out the invention has been described in detail, those familiar with the art to which this invention relates will recognize various alternative designs and embodiments for practicing the invention as defined by the following claims.

What is claimed is:

1. A copy valve comprising:

a housing having four internal chambers;

a first input port provided through said housing for transmitting a first pressurized fluid received from a first external source to a first of said four internal chambers;

an output port provided through said housing for transmitting a second pressurized fluid from a second of said four internal chambers external to said housing;

a second input port provided through said housing for transmitting a third pressurized fluid received from a second external source to a third of said four internal chambers;

a third input port provided through said housing for transmitting a fourth pressurized fluid received from a third external source to a fourth of said four internal chambers; and means responsive to the pressure of said first, second and third pressurized fluids being substantially equal for providing an unobstructed fluid path between said first chamber and said second chamber, said means further responsive to the pressure of said third pressurized fluid in said third chamber being less than the pressure of said first and fourth pressurized fluids for blocking said unobstructed path between said first and second chambers and reducing the pressure in said second chamber to be substantially equal to the pressure in said third chamber, and further responsive to the pressure of said fourth pressurized fluid being less than the pressure of said first pressurized fluid, independent of the pressure of said third pressurized fluid to provide an unobstructed fluid path between said first and second chambers.

2. The copy valve of claim 1 wherein said means responsive to the pressure of said first, third and fourth pressurized fluids comprises:

a piston slidably disposed in said housing between a first position and a second position, said piston having a first end, an opposite end and an annular collar intermediate said first and second end, said first chamber being formed between said first end and said housing, said second chamber being formed between said second end and said housing, said third chamber being formed between a first face of said annular collar and said housing and said fourth chamber being formed between an opposite face of said annular collar and said housing; and a spring disposed in said housing biasing said piston to said first position to increase the volumes of said first and third chambers.

3. The copy valve of claim 2 wherein said piston has a throughbore connecting said first chamber to said second chamber and a check valve disposed in said throughbore, said check valve actuated to an open state in response to said piston being in said first position and closed in response to an initial displacement of said piston toward said second position.

4. The copy valve of claim 3 wherein said check valve comprises:

a ball seat provided at the end of said piston adjacent to said second chamber, said ball seat concentric with said throughbore;

a ball disposed in said throughbore engageable with said ball seat;

a spring disposed in said throughbore biasing said ball toward said ball seat; and a ball stem attached to said housing concentric with said throughbore, said ball stem having a free end engageable with said ball when said piston is in said first position, said engagement of said ball stem with said ball displacing said ball from said ball seat.

5. The copy valve of claim 1 wherein said means responsive to said first, third and fourth pressurized fluid comprises:

a first piston slidably disposed in said third chamber, displaceable from a second position to a first position in response to said third chamber receiving said third pressurized fluid;

a spring resiliently biasing said first piston toward said first position;

a first valve attached to said first piston, said first valve having an open state in response to said piston being in said first position and a closed state in response to said first piston being in said second position, said first valve in said first state permitting a fluid flow from said first chamber to said third chamber and in said second state prohibiting a fluid flow from said first chamber to said third chamber;

a fluid passageway connecting said third chamber to said fourth chamber;

a second piston disposed in said fourth chamber displaceable from a second position to a first position in response to said fourth pressurized fluid being received in said fourth chamber; and a second valve attached to said second piston, said second valve blocking a fluid flow from said first chamber to said second chamber and enabling a fluid flow from said fourth chamber to said second chamber when said second piston is in said first position and enabling a fluid flow from said first chamber to said second chamber and blocking a fluid flow from said fourth chamber to said second chamber when said second piston is in said second position.

6. The copy valve of claim 5 wherein said first piston is displaced from said first position in response to the pressure of said first pressurized fluid being greater than the pressure of said second pressurized fluid, said displacement of said first piston extracting fluid from said second chamber so that the pressure of the fluid in said second chamber is substantially equal to the pressure of said second pressurized fluid.

7. The copy valve of claim 6 wherein said first and fourth external sources of pressurized fluid are the outputs of the two cylinders of a dual master brake cylinder of an automotive vehicle, said third external source of pressurized fluid is the pressurized fluid being supplied to a first brake actuator of one wheel of said vehicle and said output port of said second chamber is connected to a second brake actuator of a second wheel.

8. The copy valve of claim 7 wherein the pressure of said third pressurized fluid is controlled by an electronic control of an anti-lock brake system, said copy valve duplicating the pressure applied to said brake actuator of said second wheel to be the same as the pressure of said pressurized fluid being applied to the brake actuator of said one wheel.

9. A copy valve in an anti-lock brake system for an automotive vehicle, said anti-lock brake system having a dual master brake cylinder and an electronic control controlling the pressure of the brake fluid applied to the brake actuator for one of the rear wheels of the vehicle, said copy valve comprising:

a housing enclosing a cylindrical chamber, said cylindrical chamber having an intermediate annular recess;

a piston slidably disposed in said cylindrical chamber, said piston having an annular collar received in said annular recess, said piston slidable in said cylindrical chamber between a first position and a second position;

a first inlet port connected to a first chamber formed between said housing and one end of said piston, said first inlet port connectable to one of said dual master brake cylinders;

an output port connected to a second chamber formed between said housing and an end of said piston opposite said one end, said output port connectable to the brake actuator for the other rear wheel of the vehicle;

a second inlet port connected to a third chamber formed between one face of said annular collar and an adjacent face of said annular recess, said second inlet port connectable to the brake actuator for said one wheel;

a third inlet port connected to a fourth chamber formed between a second face of said annular shoulder and an adjacent face of said annular recess, said third inlet port connectable to the other of said dual master brake cylinder;

a fluid passageway provided through said piston between said first and said second chambers;

a valve disposed in said through passageway, said valve activated to an open state, permitting a fluid flow from said first to said second chamber in response to said piston being in said first position and activated to a closed blocking said fluid flow from said first to said second chamber in response to said piston being displaced from said second chamber.

10. A copy valve in an anti-lock brake system for an automotive vehicle, said anti-lock brake system having a dual master brake cylinder, and an electronic control controlling the fluid pressure applied to a brake actuator associated with one of the rear wheels of the vehicle, said copy valve comprising:

a housing having four internal chambers;

a first port associated with a first of said four internal chambers, said first inlet port connectable to one cylinder of said dual master brake cylinder;

a second port associated with a second of said four internal chambers, said outlet port connectable to a brake actuator of a brake actuator associated with said second wheel of said vehicle;

a third port associated with a third of said four internal chambers, said third port connectable to the brake actuator associated with said one of said rear wheels of said vehicle;

a fourth port associated with a fourth of said four internal chambers, said fourth port connectable to a second cylinder of said dual master cylinder;

a first piston disposed in said third chamber displaceable from a second position to a first position in response to receiving a pressurized fluid through said third port and displaceable from said first position to said second position in response to the pressure of a fluid received through said first port being greater than the pressure of a fluid received into said second chamber through said second port;

a valve attached to said first piston having an open state permitting a fluid flow from said first chamber to said third chamber when said first piston is in said first position, and a closed state prohibiting a fluid flow from said first chamber to said third chamber in response to said piston being displaced from said first position;

a fluid passageway connecting said third chamber to said fourth chamber;

a second piston disposed in said fourth chamber displaceable from a second position to a first position in response to receiving a fluid pressure on one side of said second piston being substantially equal to the fluid pressure on the reverse side of said second piston and displaceable from said first position to said second position in response to said fluid pressure on one side of said second piston being less than said fluid pressure on said reverse side; and a dual valve attached to said second piston, said dual valve prohibiting a fluid flow from said first chamber to said second chamber and permitting a fluid flow from said fourth chamber to said second chamber when said second piston is in said first position and permitting a fluid flow from said first chamber to said second chamber and prohibiting a fluid flow from said chamber to said second chamber when said second piston is in its second position.

* * * * *

UNITED STATES PATENT AND TRADEMARK OFFICE
CERTIFICATE OF CORRECTION

PATENT NO. : 5,470,137
DATED : November 28, 1995
INVENTOR(S) : Every, et al

It is certified that error appears in the above-indentified patent and that said Letters Patent is hereby corrected as shown below:

Claim 10, column 12, line 37, insert the word -- fourth -- before the word "chamber". (second occurrence)

Signed and Sealed this

Ninth Day of April, 1996

Attest:

BRUCE LEHMAN

Attesting Officer

Commissioner of Patents and Trademarks